United States Patent
Minto et al.

(10) Patent No.: US 10,197,694 B2
(45) Date of Patent: Feb. 5, 2019

(54) CONTROLLED-FREQUENCY DOWNHOLE SEISMIC SOURCE

(71) Applicant: Schlumberger Technology Corporation, Sugar Land, TX (US)

(72) Inventors: James Minto, Houston, TX (US); Robert Lanza, Los Gatos, CA (US); Ryosei Aoki, Tokyo (JP); Herve Denaclara, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 268 days.

(21) Appl. No.: 15/093,295

(22) Filed: Apr. 7, 2016

(65) Prior Publication Data
US 2016/0299246 A1    Oct. 13, 2016

Related U.S. Application Data

(60) Provisional application No. 62/144,549, filed on Apr. 8, 2015.

(51) Int. Cl.
| | | |
|---|---|---|
| *G01V 1/52* | (2006.01) |
| *G01V 1/42* | (2006.01) |
| *G01V 1/44* | (2006.01) |
| G01V 1/047 | (2006.01) |
| G01V 1/133 | (2006.01) |
| G01V 1/143 | (2006.01) |
| G01V 1/02 | (2006.01) |

(52) U.S. Cl.
CPC .............. *G01V 1/52* (2013.01); *G01V 1/42* (2013.01); *G01V 1/44* (2013.01); *G01V 1/047* (2013.01); *G01V 1/133* (2013.01); *G01V 1/143* (2013.01); *G01V 1/159* (2013.01); *G01V 2001/526* (2013.01); *G01V 2210/1299* (2013.01); *G01V 2210/1425* (2013.01); *G01V 2210/1429* (2013.01)

(58) Field of Classification Search
CPC ........ G01V 1/52; G01V 11/005; G01V 1/047; G01V 1/40; E21B 28/00; E21B 43/003
See application file for complete search history.

(56) References Cited

U.S. PATENT DOCUMENTS

| | | | | | |
|---|---|---|---|---|---|
| 2,394,977 | A | * | 2/1946 | Boynton | ................. E21B 34/08 166/125 |
| 4,702,343 | A | * | 10/1987 | Paulsson | ................ G01V 1/145 181/106 |
| 4,805,727 | A | * | 2/1989 | Hardee | .................. G01V 1/155 181/106 |
| 4,867,096 | A | * | 9/1989 | Cole | ...................... G01V 1/053 181/114 |
| 4,991,685 | A | * | 2/1991 | Airhart | .................. G01V 1/147 181/106 |
| 5,005,665 | A | * | 4/1991 | Cheung | ................. B06B 1/0607 181/101 |

(Continued)

*Primary Examiner* — Kipp C Wallace
(74) *Attorney, Agent, or Firm* — Michael Dae

(57) ABSTRACT

Systems and methods for deploying and using a controlled-frequency downhole seismic source are provided. A downhole seismic source may be placed into a borehole in a geological formation and coupled rigidly to the geological formation via an edge of the borehole. A controlled-frequency seismic signal may be generated sufficient to enable a seismic measurement of the geological formation.

12 Claims, 10 Drawing Sheets

(56) References Cited

U.S. PATENT DOCUMENTS

| | | | | |
|---|---|---|---|---|
| 5,438,170 A | * | 8/1995 | Klaveness | G01V 1/137 |
| | | | | 181/106 |
| 5,901,113 A | * | 5/1999 | Masak | G01V 1/133 |
| | | | | 367/41 |
| 9,228,418 B2 | * | 1/2016 | Badri | E21B 28/00 |
| 2002/0179364 A1 | * | 12/2002 | Bussear | G01V 1/02 |
| | | | | 181/108 |
| 2006/0023567 A1 | * | 2/2006 | Uhl | G01V 1/008 |
| | | | | 367/13 |
| 2010/0262372 A1 | * | 10/2010 | Le Calvez | G01V 1/288 |
| | | | | 702/14 |
| 2016/0033663 A1 | * | 2/2016 | Lu | G01V 1/52 |
| | | | | 367/25 |

\* cited by examiner

CONTROLLED-FREQUENCY DOWNHOLE SEISMIC SOURCE

CROSS-REFERENCE TO RELATED APPLICATIONS

This application claims the benefit of and priority to U.S. Provisional Patent Application Ser. No. 62/144,549, "Controlled-Frequency Downhole Seismic Source," filed on Apr. 8, 2015, which is incorporated by reference herein in its entirety for all purposes.

BACKGROUND

This disclosure relates to a downhole controlled-frequency seismic source that can output a relatively low-frequency oscillating seismic signal.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Seismic imaging may be used to identify characteristics or features of a geological formation. Among other things, these characteristics and features may include the presence or absence of certain lithological features, hydrocarbons, gases, and so forth. To obtain a seismic image, a seismic source may output a seismic signal into the geological formation. A seismic receiver may detect a resulting seismic signal that occurs after passing through the geological formation. Depending on the constituency of the geological formation, the receiver will detect certain variations in the seismic signal. Thus, the detected seismic signal may be used to determine certain properties of the geological formation, such as the lithology of the geological formation or the contents of a hydrocarbon zone in the geological formation.

Seismic sources may be deployed on the surface of the geological formation or in a borehole. Many seismic sources are impulsive, using explosives or airguns to emit a seismic signal into the geological formation. In cases where a seismic source is deployed downhole, the seismic source may be coupled to the geological formation—that is, connected to the geological formation so as to permit force from the seismic source to be transmitted into the geological formation—using a fluid. This is referred to as "fluid coupling." Although fluid coupling may be effective for impulsive seismic sources, fluid may absorb low-frequency seismic energy. Thus, many downhole seismic sources may not be able to adequately provide low-frequency seismic signals.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to systems, methods, and devices for installing and/or using a downhole seismic source that can provide a controlled-frequency seismic signal into a geological formation. An example method includes placing a downhole seismic source into a borehole in a geological formation and coupling the downhole seismic source rigidly to the geological formation via an edge of the borehole. A controlled-frequency seismic signal may be generated that is sufficient to enable a seismic measurement of the geological formation.

In another example, a downhole seismic source includes a housing and an actuator. The housing couples to a geological formation via an edge of a borehole in the geological formation. The actuator is attached to the housing and generates a controlled-frequency seismic signal of less than 500 Hz to enable a seismic measurement of the geological formation.

In another example, a method includes generating an oscillating seismic signal having a frequency lower than 500 Hz using a downhole seismic source installed in a borehole in a geological formation. The seismic signal may be detected using a seismic receiver to enable a seismic measurement of the geological formation.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended just to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
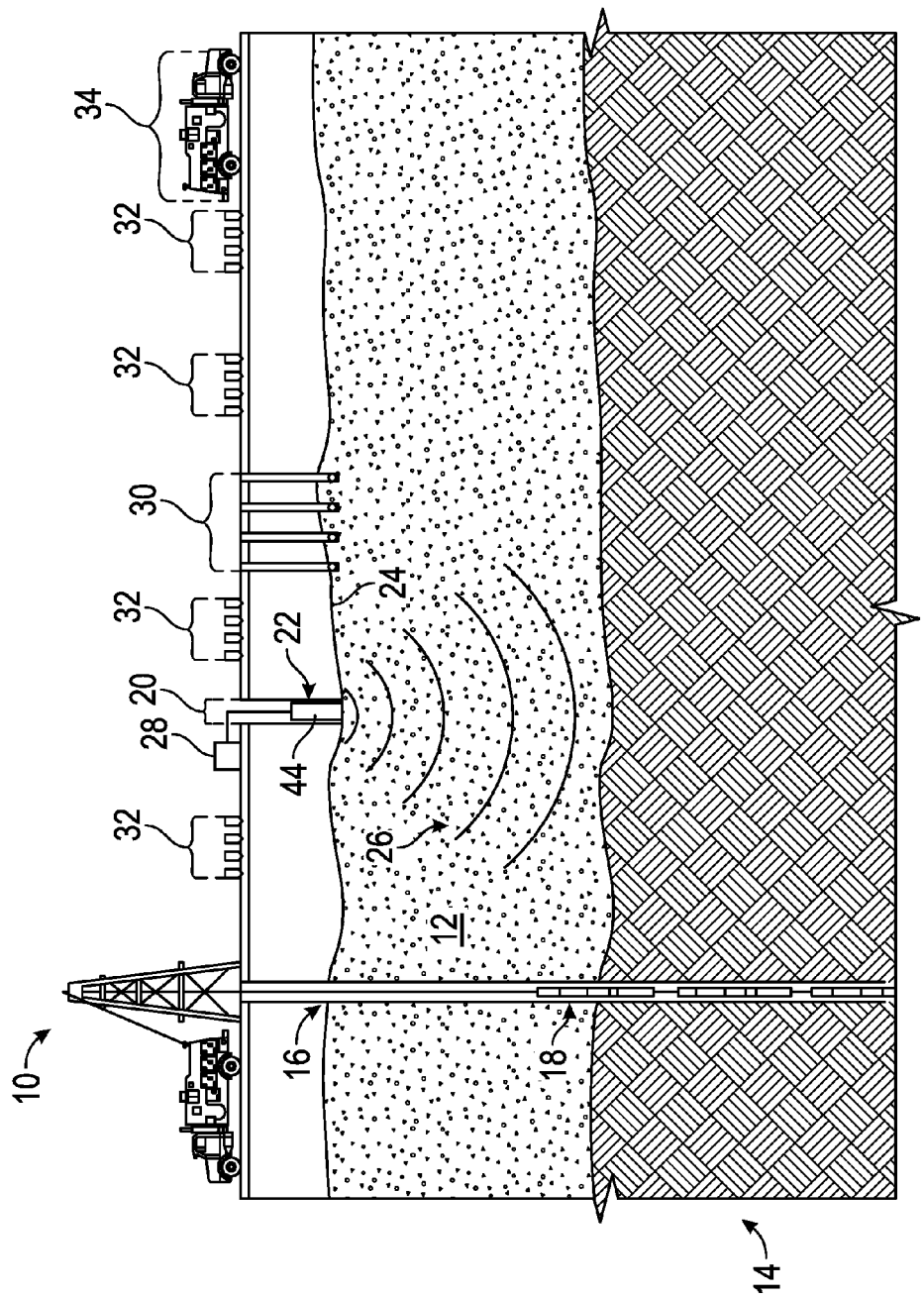
FIG. 1 is a schematic diagram of a seismic imaging system used for imaging a geological formation, in accordance with an embodiment.

One or more specific embodiments of the present disclosure will be described below.

These described embodiments are just examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, seismic imaging may be used to identify characteristics or features of a geological formation. Among other things, these characteristics and features may include the presence or absence of certain lithological features, hydrocarbons, gases, and so forth. One manner of obtaining seismic information may be through a controlled-frequency downhole seismic source.

This disclosure describes a controlled-frequency downhole seismic source that may be able to provide a controlled-frequency seismic signal (e.g., a vibration signal of defined frequency or frequencies). Rather than rely on fluid coupling, the controlled-frequency downhole seismic source of this disclosure may be rigidly coupled to the geological formation. As used herein, the expression "rigidly coupled" refers to any suitable coupling that is rigid enough not to absorb too much of the output seismic signal in the frequency range of interest. For example, the controlled-frequency downhole seismic source may emit a relatively low-frequency seismic signal of less than about 500 Hz. Indeed, in some examples, the relatively low-frequency seismic signal may be less than 100 Hz, less than 10 Hz, or even about or less than 1 Hz owing to the rigid coupling of the seismic source to the geological formation. The coupling mechanism for the controlled-frequency downhole seismic source may be a heavy pipe, a heavy weight, cams, wedges, or clamps, and so forth, that do not absorb too much of the seismic signal, but instead allow the controlled-frequency downhole seismic source to output the seismic signal into the geological formation.

Such a controlled-frequency downhole seismic source may be used, for example, a seismic imaging system 10 as shown in FIG. 1. The seismic imaging system 10 may be used to image a geological formation 12 that includes, in the example of FIG. 1, a hydrocarbon zone 14 or other geological region of interest. A borehole 16 may be drilled into the hydrocarbon zone 14. A downhole tool 18 may be used to gather information from time to time. In one example, the downhole tool 18 may include seismic receivers that can detect seismic signals from other seismic sources.

A controlled-frequency downhole seismic source system 20 may be used to emit a seismic signal into the geological formation 12. Here, the controlled-frequency downhole seismic source system 20 includes a downhole seismic source 44 installed in an investigation borehole 22. The borehole 22 extends to below a weathering layer 24 and/or other acoustically attenuating geological layers. Because the weathering layer 24 and other surface conditions might otherwise absorb seismic energy, installing the downhole seismic source 44 below the weathering layer 24 may allow the controlled-frequency downhole seismic source system 20 to emit a controlled-frequency seismic signal 26 (e.g., vibration) of much better quality into the geological formation 12. As may be appreciated, the weathering layer 24 and other surface conditions might otherwise absorb seismic energy and, accordingly, reduce the bandwidth of the seismic signal 26. Moreover, the weathering layer 24 may pose a challenge to repeat measurements over time. Thus, by placing the downhole seismic source 44 beneath the weathering layer 24, these problems may be reduced or avoided. Surface equipment 28 may control and power the controlled-frequency downhole seismic source system 20.

A variety of seismic receivers, such as buried seismic receivers 30, surface seismic receivers 32, and/or seismic receivers in the downhole tool 18 may detect the controlled-frequency seismic signal 26 after it has traveled through the geological formation 12. Different features and characteristics of the geological formation 12 may affect the controlled-frequency seismic signal 26 in different ways (e.g., by absorbing the signal, scattering the signal, refracting the signal, reflecting the signal, and so forth). As a result of these interactions, geological features and characteristics of the geological formation 12 may be identified through any suitable seismic imaging techniques. It may be appreciated that other seismic receivers and sources may also be used in the seismic imaging system 10. One non-limiting example may be a vehicle-based seismic imager 34, which may be a seismic source or receiver, or both, though any other suitable sources and receivers may also be used.

The seismic imaging system 10 may use the controlled-frequency downhole seismic source system 20 to conduct seismic investigation of the geological formation 12 over time. Indeed, the controlled-frequency downhole seismic source system 20 may be used to operate continuously or intermittently for long or short periods of time (e.g., a few minutes, a few hours, a few days, a few weeks, months, or even years). This may allow for characterization and/or long term monitoring of reservoirs that otherwise might not be possible or cost-effective. Indeed, the controlled-frequency downhole seismic source 20 may serve as a consistently similar source that can calibrate arrays of seismic sensors deployed to monitor hydraulic fractures, as well as naturally occurring seismic events and induced seismicity.

Figure 2:
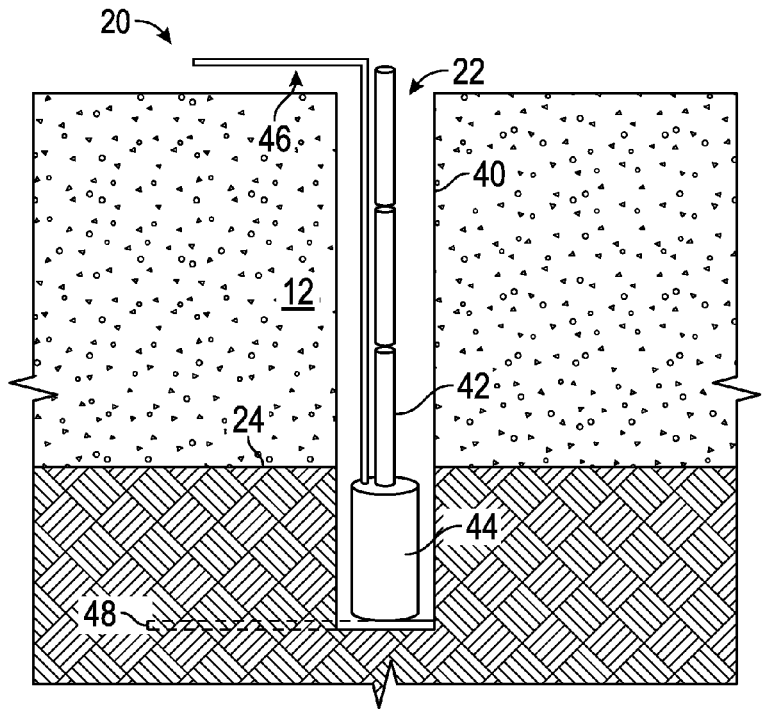
FIG. 2 is a schematic view of a controlled-frequency downhole seismic source that is rigidly coupled to the geological formation to enable the emission of a low-frequency signal into the geological formation, in accordance with an embodiment.

A block diagram of the controlled-frequency downhole seismic source system 20 appears in FIG. 2. In the example of FIG. 2, the borehole 22 has been drilled and completed. A casing 40 of any suitable material lines the borehole 22. A coupling mechanism 42, such as pipe that may have been used in the initial installation of the downhole seismic source 44, may rigidly couple the downhole seismic source 44 to the borehole. A cable 46 may supply electricity and/or control signals from the surface equipment 28 to the downhole seismic source 44.

Any suitable coupling mechanism may be used to rigidly couple the downhole seismic source 44 to the geological formation 12. In the example shown in FIG. 2, the coupling mechanism is pipe 42 that presses the downhole seismic source 44 against the bottom of the borehole 22 using the weight of the mass of the pipe. To this end, the coupling mechanism may be any suitable mechanism to rigidly press the downhole seismic source 44 to the geological formation 12. Others may include clamps, cams, weight bars, wedges, gravity, and so forth. Any materials that are sufficiently rigid so as to act as a counterforce to relatively low frequency seismic signals that are generated by the downhole seismic source 44 may serve as the coupling mechanism 42.

Figure 3:
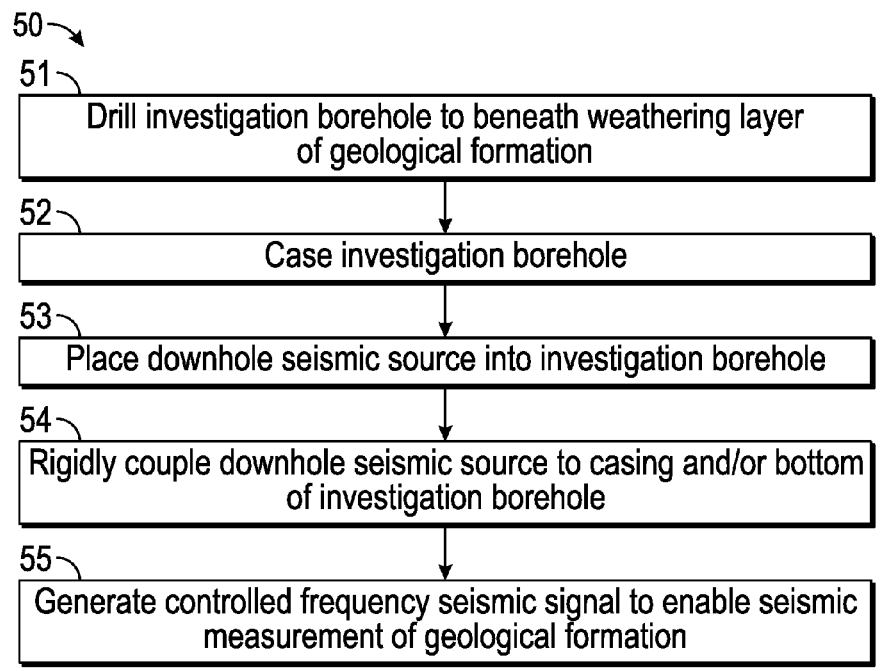
FIG. 3 is a flowchart of a method for installing and using the a schematic view of the controlled-frequency downhole seismic source, in accordance with an embodiment.

The controlled-frequency downhole seismic source system 20 may be installed as described by a flowchart 50 of FIG. 3. That is, the investigation borehole 22 may be drilled to beneath the weathering layer 24 of the geological formation 12 (block 51). The borehole 22 may be cased with a casing 40 (block 52). It may be appreciated that, in some embodiments, the borehole 22 may not be cased with casing 40. The borehole 22 may be vertical in one example, but also may be at least partially horizontal in other examples.

The downhole seismic source 44 may be deployed into the borehole 22 using any of a variety of ways. For example, deployment of the downhole seismic source 44 to depth may be achieved using cable, tubing, casing, drill pipe, or coiled tubing (block 53). The downhole seismic source 44 may be rigidly coupled to the casing 40 and/or the bottom of the borehole 22 (block 54). For example, the equipment used in the different deployment methods may allow their weight to be used to couple the downhole seismic source 44 to the geological formation 12. As noted above, deployment to depth can also be achieved using a cable containing conductors or a cable with conductors attached alongside. To utilize gravity for coupling with cable deployment, additional weights (e.g., weight bars) may be attached between the cable and the downhole seismic source 44. Additional materials that may couple the downhole seismic source 44 to the casing 40 and/or the bottom of the borehole 20 may include cams, wedges, clamps, and so forth. Moreover, when the downhole seismic source 44 is deployed and coupled to the geological formation 12 using sections of pipe 42, the pipe 42 may be filled with cement to add additional weight, and may extend substantially to the surface or just partway. The downhole seismic source 44 may be considered to be sufficiently rigidly coupled to the geological formation 12 when the downhole seismic source 44 is able to output the controlled-frequency seismic signal 26 into the geological formation 12 without the signal being substantially attenuated by the coupling mechanism (e.g., as might occur with fluid coupling).

Figure 4:
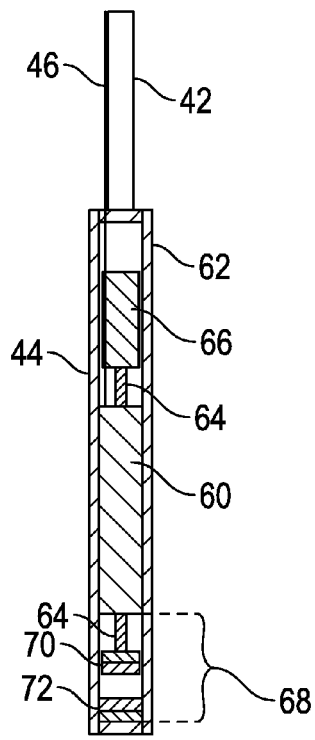
FIG. 4 is a block diagram of one example of the downhole seismic source of FIG. 2, in accordance with an embodiment.

Having installed the downhole seismic source 44 into the borehole 20 and coupled the downhole seismic source 44 to the geological formation 12, the downhole seismic source 44 may be used to generate the controlled-frequency seismic signal 26 (block 55). To generate the controlled-frequency seismic signal 26, the downhole seismic source 44 may operate an actuator 60 attached to a housing 62, as shown in FIG. 4. The actuator 60 may move a shaft 64 to apply a force to a reaction mass 66. Because the housing 62 of the downhole seismic source 44 is rigidly coupled to the geological formation 12, the movement of the actuator 60 and the equal and opposite reaction to the force by the reaction mass 66 causes the housing 62 to impart the force into the geological formation 12 as the seismic signal 26. Bearings (not shown) may be used to reduce friction caused when the actuator 60 moves the reaction mass 66. The bearings may be particularly helpful when the actuator 60 is disposed wholly or partly horizontally.

The actuator 60 may be pneumatic, piezoelectric, hydraulic, magnetorestrictive, and/or electromagnetic, and/or may use any other suitable actuation mechanism. The actuator 60 may move the shaft 64 over a range of motion (e.g., +/−1.5 inches) forward and backward in relation to an axis of the actuator 60 at a desired frequency (e.g., when the actuator 60 is oriented vertically, the actuator 60 may move the shaft 64 up and down). The frequency of the motion of the actuator 60 is substantially the frequency of the output seismic signal 26. Control and power signals may be provided via the cable 46.

Tubing or pipe 42 may provide enough weight on the downhole seismic source 44 to rigidly couple the downhole seismic source 44 to the geological formation 12. In one example, tubing or pipe 42 may extend to the surface and be weighted by a rig and/or other deployment devices. The tubing or pipe 42 may be filled with a weight-adding material, such as cement, and may or may not extend to the surface. In at least one embodiment, the tubing or pipe 42 may be retrievable (e.g., after the downhole seismic source 44 is installed or upon removal of the downhole seismic source 44 after its use).

A positioning system 68 may be used to ensure the actuator 60 is operating over the desired range of motion. In the example of FIG. 4, the positioning system 68 includes two permanent magnets 70 and 72 that apply increasingly more force the closer the permanent magnets 70 and 72 are placed to one another. Depending on the distance that the shaft 64 is extended out of the actuator 60, a particular level of force may occur due to the proximity of the permanent magnets 70 and 72. A first amount of force from the permanent magnets 70 and 72 may be associated with a center of the desired range of motion and a second amount of force from the permanent magnets 70 and 72 may be associated with an endpoint of the range of motion. Although the positioning system 68 shown in FIG. 4 uses permanent magnets, springs, position sensors, and the like may also be used to maintain a relatively consistent range of motion of the actuator 60.

Figure 5:
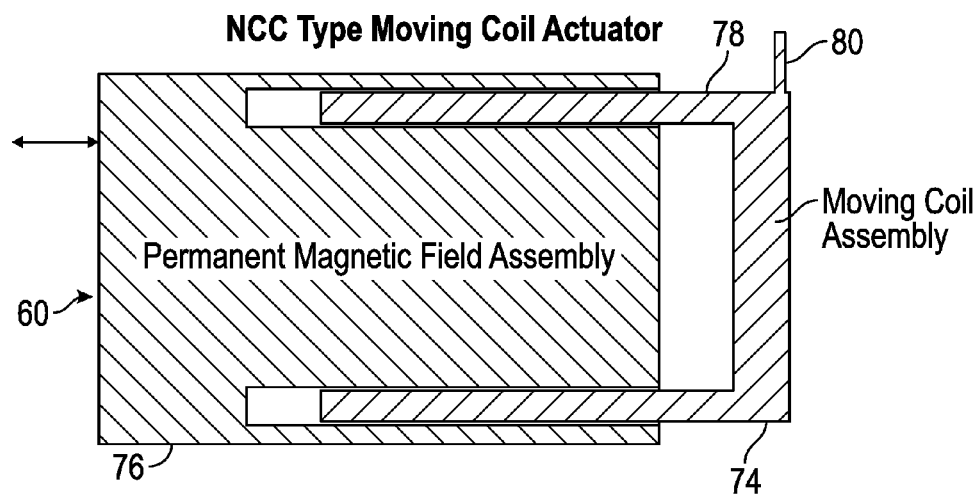
FIG. 5 is a block diagram of a voice coil actuator that may be used in the downhole seismic source, in which the voice coil has a moving coil assembly, in accordance with an embodiment.
Figure 6:
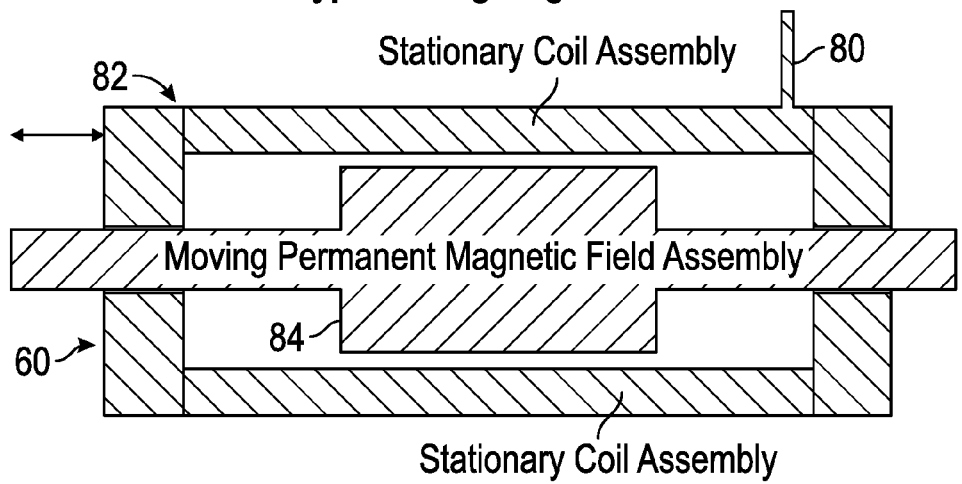
FIG. 6 is a block diagram of a voice coil actuator that may be used in the downhole seismic source, in which the voice coil has a moving permanent magnet assembly, in accordance with an embodiment.

As mentioned above, the actuator 60 may operate using electromagnetism and, as such, may be a voice coil. FIGS. 5 and 6 show examples of voice coils that may be used as the actuator 60. In FIG. 5, a moving coil assembly 74 is radially surrounded by a fixed permanent magnetic field assembly 76. The moving coil assembly 74 includes a center shaft 78 that is wrapped by a coil of conductive wire 80. When current is applied to the conductive wire 80, an electromagnetic field causes the moving coil assembly 74 to repel or attract the fixed permanent magnetic field assembly 76. This causes the moving coil assembly 74 to move in or out depending on the polarity of the current.

The voice coil actuator 60 shown in FIG. 6 uses a stationary coil assembly 82 and a moving permanent magnetic field assembly 84. The stationary coil assembly 82 includes the coil of conductive wire 80. When current is applied to the conductive wire 80, an electromagnetic field causes the stationary coil assembly 82 to repel or attract the moving permanent magnetic field assembly 84. This causes the moving permanent magnetic field assembly 84 to move in or out depending on the polarity of the current.

Figure 7:
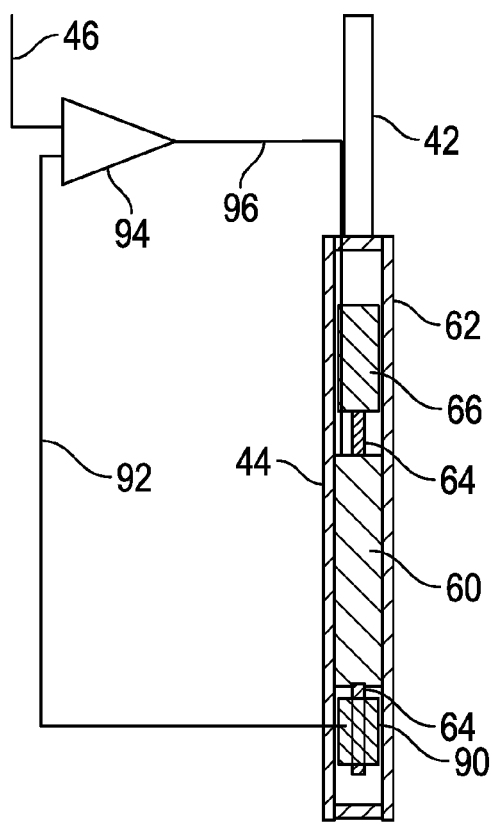
FIG. 7 is a is a block diagram of another example of the downhole seismic source that operates using feedback from a position sensor, in accordance with an embodiment.

As shown in FIG. 7, a position encoder 90 may be used to determine a position of the actuator 60. The position encoder 90 may use any suitable sensor to determine a position of the actuator 60 by monitoring a position of the shaft 64. For example, the position encoder 90 may be a capacitive sensor, an inductive sensor, a magnetoresistive sensor, an LVDT sensor, an optical sensor, a time-domain reflectance sensor, or mechanical sensor (e.g., a linkage). The position determined by the position encoder 90 may be used to control the actuator 60. For instance, a position signal 92 may be compared to a reference position control signal from the cable 46 in an operational amplifier 94 or comparable circuitry (e.g., digital comparator). A control signal 96 may be generated to control the actuator 60 to maintain its operation within the desired range of motion.

Figure 8:
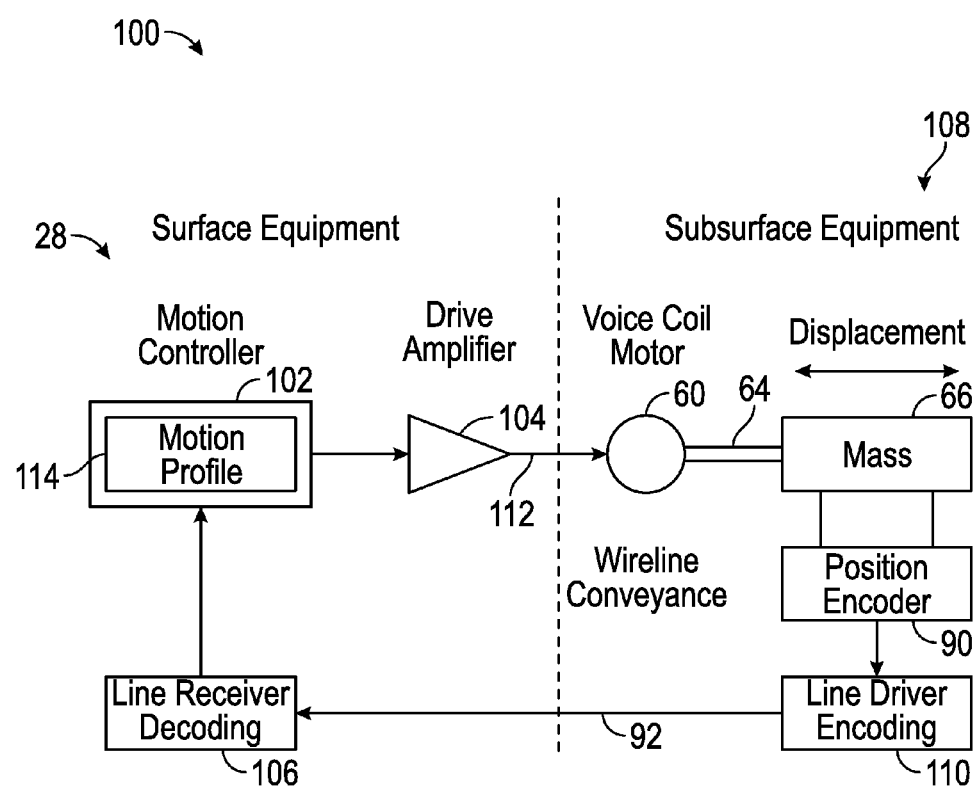
FIG. 8 is a block diagram describing components for controlling the downhole seismic source that may be located at the surface and those that may be located downhole, in accordance with an embodiment.

FIG. 8 illustrates a general topology of a seismic source control system 100 to control the downhole seismic source 44. The system 100 of FIG. 8 locates motion controller 102 electronics, a drive amplifier 104, and line receiver decoding 106 among the surface equipment 28. Subsurface equipment 108 within the borehole 22 include the voice coil 60 (e.g., the voice coil motor), which is coupled to the moving mass 66 via the shaft 64, the position encoder 90 (e.g., position encoder), and line driver encoding 110. Cabling and/or wires convey power signals and electrical control signals (e.g., power signal 112 and the position signal 92) between the surface equipment 28 and the subsurface equipment 108. It should be appreciated, however, that the surface equipment 28 may be located downhole with the subsurface equipment 108, provided that energy is provided to these components from the surface.

The motion controller 102 provides a command signal to the drive amplifier 104, which activates the voice coil 60, resulting in mass 66 motion. The position encoder 90 measures the absolute position of the moving mass 66. This position data is fed back to the motion controller 102 via the line driver encoding 110—line receiver decoding 106 and made available to the motion controller 102. The moving mass 66 vibratory operational range may be from 10 to 500 Hz, but may be higher or lower in other examples. In one example, the electro-mechanical transfer function of the moving mass 66 and the voice coil 60 may a factor of 100 reduction in mechanical movement given constant applied voice coil RMS power over the range of 10 to 100 Hz.

The moving mass 66 weight (and/or an accompanying centering spring) may be selected such that for maximum applied voice coil 60 power at the lowest operating frequency, shaft 64 excursions are constrained to near voice coil 60 operational limits. (For a given input power and frequency, increasing the moving mass 66 weight reduces movement of the shaft 64 of the voice coil 60.) However, this value of weight may preclude any appreciable shaft 64 movement at the highest desired operating frequency. To allow operation at higher voice coil 60 operating frequencies, the shaft 64 weight may be reduced and, correspondingly, the voice coil 60 input power reduced at low operating frequencies to limit shaft 64 excursions. Thus, the allowed voltage applied to the voice coil 60 may be a function (e.g., a complex function) that may be limited by, for example: 1.) shaft 64 excursion, 2.) frequency of operation, 3.) maximum allowed applied voltage, and/or 4.) maximum voice coil power. A motion profile 114, which may be carried out by the motion controller 102, may be tailored and limited by these parameters. Indeed, it should be appreciated that the motion controller 102 may include any suitable circuitry (e.g., an application-specific integrated circuit (ASIC), a programmable logic device (PLD), a processor and memory) that may carry out the motion profile 114. For instance, the motion profile 114 may represent instructions encoded on a tangible, non-transitory article of manufacture, such as a memory device, that may be executed by the motion controller 102.

Figure 9:
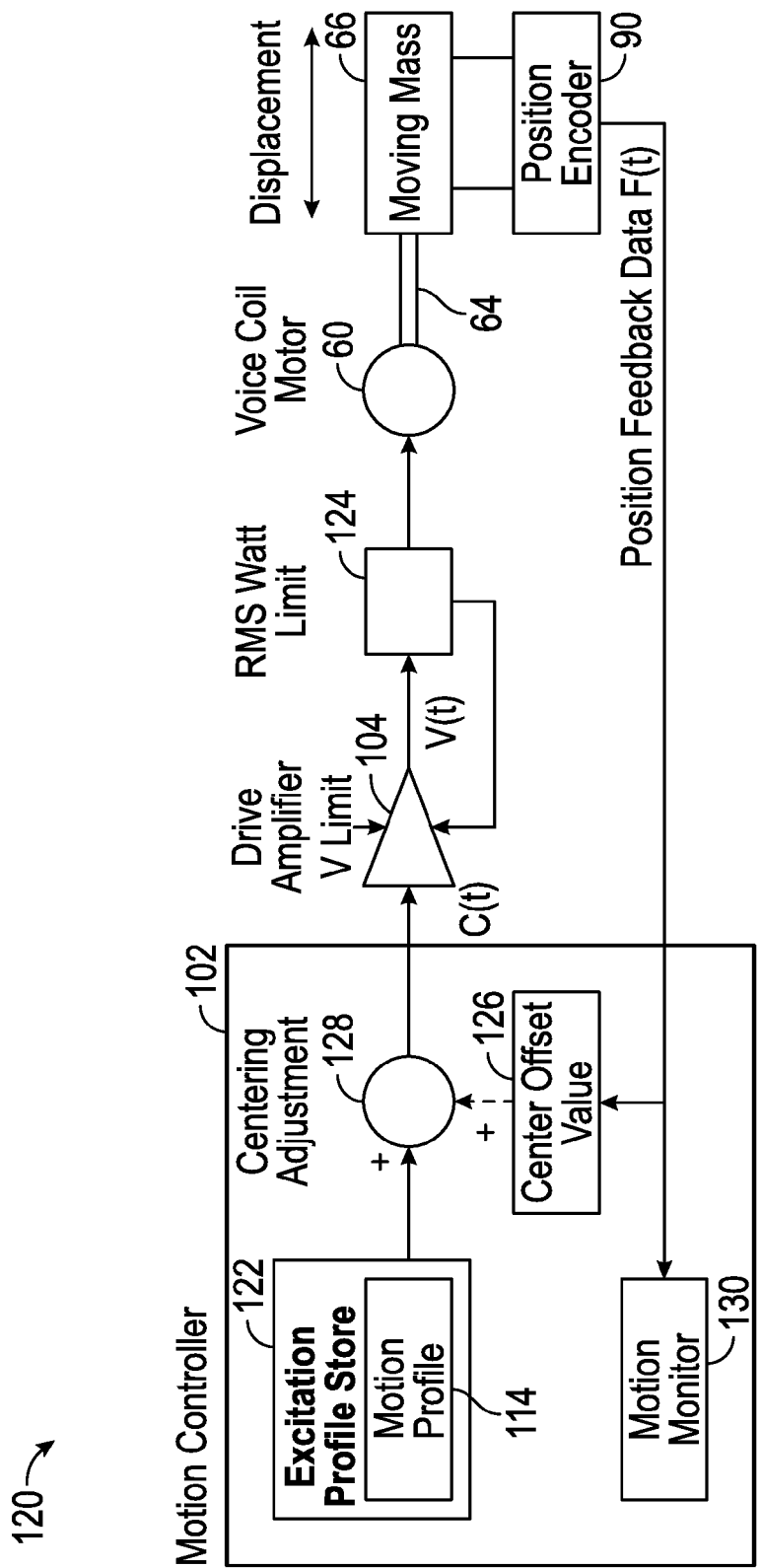
FIG. 9 is a block diagram of an open-loop control system for controlling the downhole seismic source, in accordance with an embodiment.

FIG. 9 shows a seismic source control system 120 that uses an open loop topology. The motion controller 102 contains a defined motion profile 114 that may be loaded into an excitation profile store 122. The excitation profile store 122 may be any suitable tangible, non-transitory article of manufacture, such as a memory device, that may store the motion profile 114 for execution by the motion controller 102. The motion profile 114 may define a desired motion of the moving mass 66 and may take a generally sinusoidal form (e.g., sweep, chirp). The output of the motion controller 102 may be a control signal C(t) that is the command to the drive amplifier 104. The drive amplifier 104 produces the voice coil terminal voltage V(t), constrained by a maximum voltage Vlimit and subject to an RMS Watt limit 124 that folds back the drive amplifier 104 in case of excessive motion profile 114 drive. A position encoder 90 converts shaft 64 movement to an electrical signal F(t) that is made available to the motion controller 102. In addition to mechanical spring shaft 64 centering, a DC offset 126 may be applied via summation 128 prior to motion profile 114 execution/output of the control signal C(t) based upon F(t). A motion monitor 130 component of the motion controller 102 may ensure that the motion of the moving mass 66 remains within acceptable limits.

The maximum magnitude of the motion profile 114 may be determined at each operating frequency by the motion controller 102 such that the following parameters are constrained by, for example, 1.) F(t) (shaft 64 limits), 2.) V(t) (breakdown voltage), and/or 3.) RMS Watts (heating). Once the magnitude of the motion profile 114 is determined as a function of operating frequency, the motion profile 114 may be assembled and executed by the system 120 to output a seismic signal into the geological formation 12.

Figure 10:
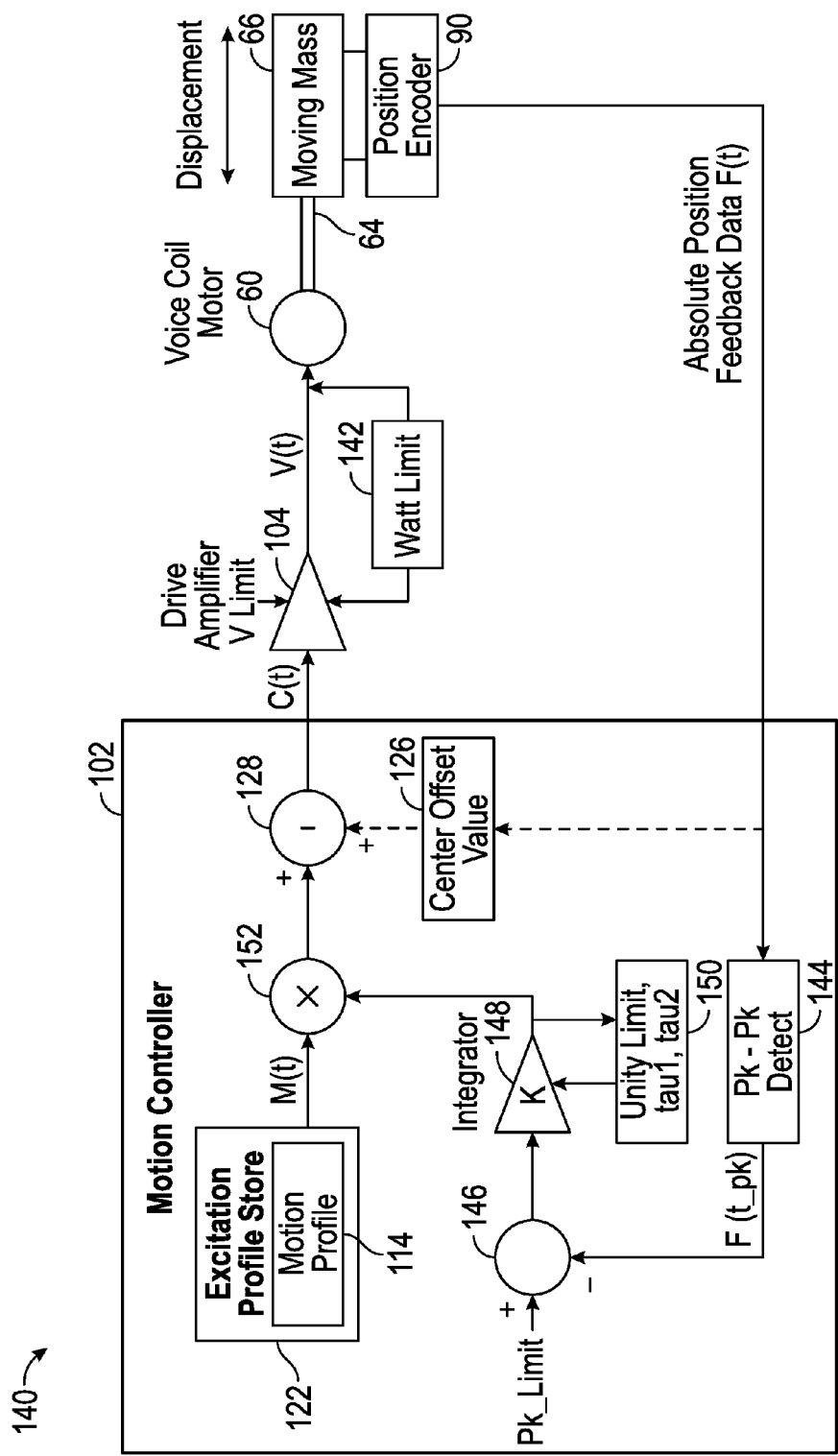
FIG. 10 is a block diagram of a closed-loop control system for controlling the downhole seismic source, in accordance with an embodiment.

FIG. 10 shows a seismic source control system 140 that uses a closed loop control topology. In FIG. 10, the motion controller 102 contains a defined motion profile 114 that may be loaded into the excitation profile store 122. As in the system 120 discussed above, the excitation profile store 122 of the system 140 may also be any suitable tangible, non-transitory article of manufacture, such as a memory device, that may store the motion profile 114 for execution by the motion controller 102. The motion profile 114 may define a desired motion M(t) of the moving mass 66 and may take a generally sinusoidal form (e.g., sweep, chirp). The motion controller 102 performs certain operations, discussed further below, to produce a control signal C(t) which is the command to the drive amplifier 104.

The drive amplifier 104 produces the voice coil motor 60 terminal voltage V(t), constrained by a maximum voltage Vlimit and subject to an RMS Watt limit 142 that folds back the drive amplifier 104 in case of excessive motion profile 114 drive. The position encoder 90 converts shaft 64 movement to an electrical signal F(t), which is made available to the motion controller 102. In addition to mechanical spring shaft 64 centering, a DC offset 126 may be applied via summation 128 prior to motion profile 114 execution/output of the control signal C(t) based upon F(t). The shaft 64 motion is constrained by a fixed peak limiting value Pk_Limit, which describes a maximum desired peak of the motion of the moving mass 66.

Moving mass 66 absolute position data F(t) are input to a peak-to-peak detection component 144 of the motion controller 102. The peak-to-peak detection component 144 computes the difference between the last positive and negative input values per cycle resulting in a signal F(t_pk). F(t_pk) is compared to the fixed peak limiting value Pk_Limit at summation logic 146 and this difference passed to an integrator 148 with gain K, attack time constant tau1, and release time constant tau2 150. Time constant tau1 may be less than time constant tau2. The integrator 148 output is constrained to the region of 0 and unity. The output of the integrator 148 is fed to a multiplier 152, which acts upon M(t) to produce C(t) (after the initial centering offset via the summation 128). If shaft 64 motion becomes excessive, F(t_pk) exceeds PK_Limit and the integrator 148 output is reduced, thus reducing C(t). If F(t_Pk) is less than PK_Limit, M(t) is not effected by the integrator 148 output.

Figure 11:
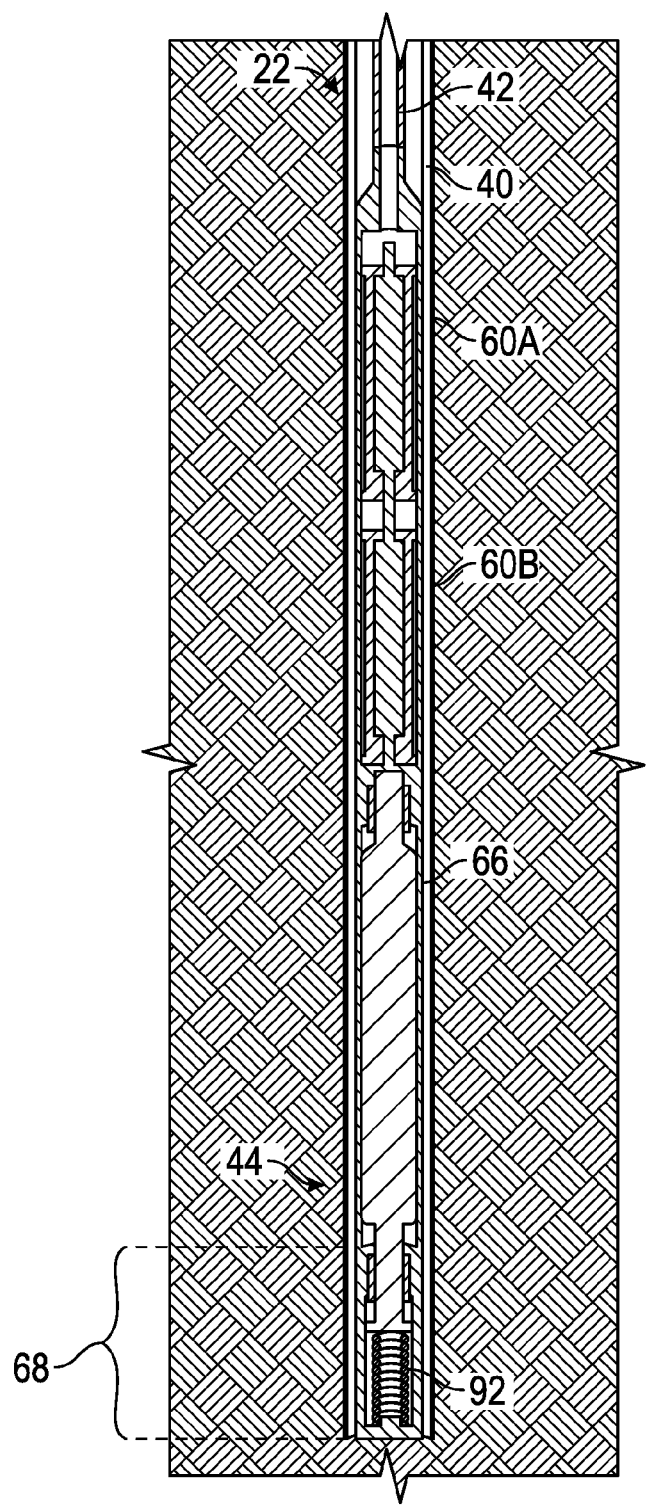
FIG. 11 is a block diagram of another example of a downhole seismic source that includes more than one actuator, in accordance with an embodiment.

Multiple actuators 60 (e.g., 60A and 60B) may be used, as shown in FIG. 11. Moreover, the reaction mass 66 may be located above or below the actuators 60, and the position system 68 may include a spring 92. It should be appreciated that the components shown in FIG. 11 may be used in other configurations. The configuration of FIG. 11 is shown by way of example to illustrate that these components of the downhole seismic source 44 may take other configurations than those expressly shown in this disclosure.

Figure 12:
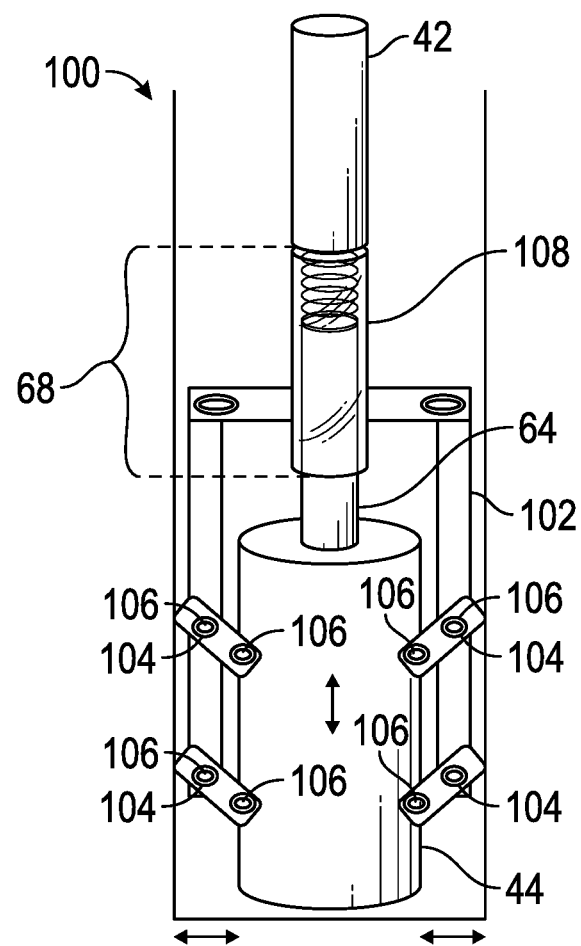
FIG. 12 is a schematic diagram of an example of a downhole seismic source that produces a horizontal seismic signal, in accordance with an embodiment.

FIG. 12 shows an example of a horizontal-signal-producing configuration 100 of a downhole seismic source 44. A housing 102 includes linkages 104 with joints 106 that Couple the horizontal motion of the downhole seismic source 44 into Horizontal motion against the geological formation 12 using the same vertical force applied from above by weights or pipe. The vertical force from above is converted to a horizontal force against the formation using a spring and sliding joint 108, linkages 102 and 104 and pivots 106. That is, the orientation of the actuator 60 within the downhole seismic source 44 in the configuration 100 may be substantially horizontal, rather than vertical as shown in other configurations above. In other words, the actuator 60 may be turned on its side to produce shear waves towards the direction of the reservoir. The linkages 102 and 104, pivots 106 and arms translate the hold-down weight of the pipe 42 to a horizontal force to couple the horizontal force from the actuator 60 into the geological formation 12.

Figure 13:
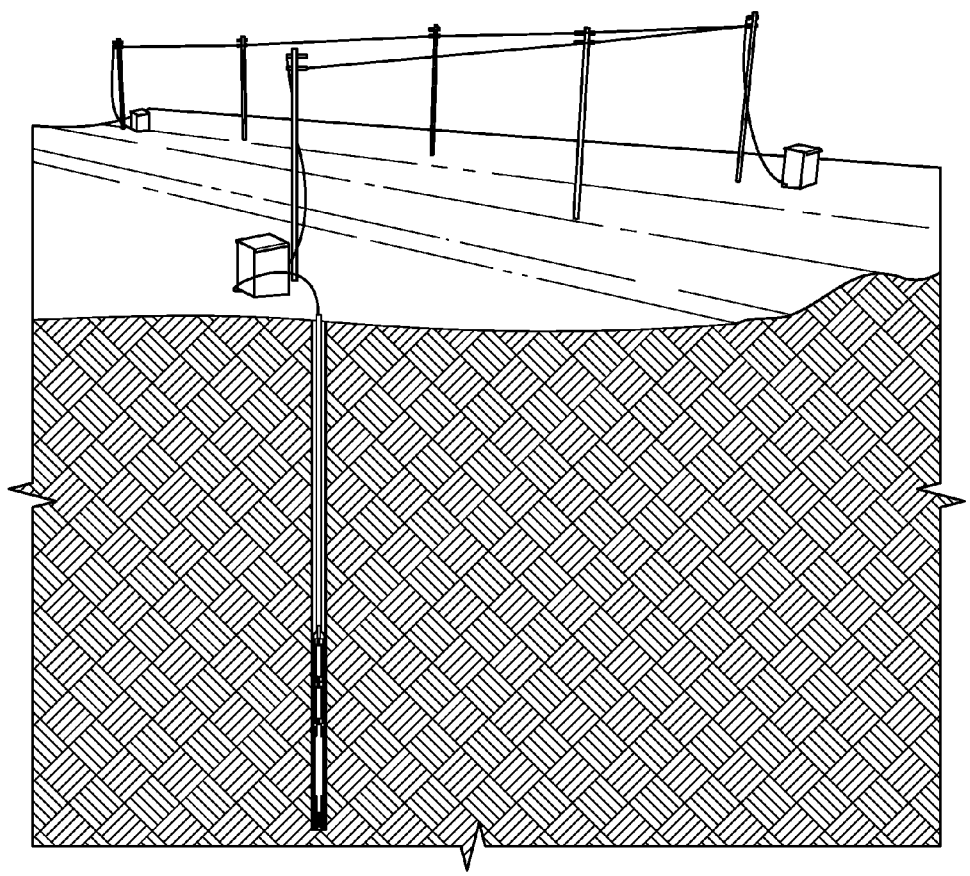
FIG. 13 is a perspective view of a layout of multiple installed downhole seismic sources that are supplied with power from a power grid, in accordance with an embodiment.

FIG. 13 shows that multiple devices can be deployed within a field and powered by generators or grid power. Autonomous operation may be achieved using wireless communications to the Internet for display of monitor and control of functionality. For increased output, multiple devices can be operated in parallel, side by side, or stacked vertically in the same hole or in multiple holes drilled in close proximity.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method comprising:
    placing a downhole seismic source into a borehole in a geological formation, wherein the downhole seismic source is placed using a cable;
    coupling the downhole seismic source rigidly to the geological formation via a bottom of the borehole; wherein coupling the downhole seismic source rigidly to the geological formation includes installing at least an additional rigid weight over the downhole seismic source and in proximity of the cable to press the downhole seismic source to the bottom of the borehole, and
generating a controlled-frequency seismic signal that enables a seismic measurement of the geological formation, wherein the additional right weight includes piping arranged along the cable and wherein installing the additional rigid weight comprises installing piping along the cable and over the downhole seismic source, wherein installing the piping comprises installing piping from the downhole seismic source to equipment at the surface of the earth.

2. The method of claim 1, wherein the downhole seismic source is coupled to a bottom of the borehole via a rigid material that is more rigid than a fluid at seismic frequencies less than about 500 Hz.

3. The method of claim 1, wherein coupling the downhole seismic source to the bottom of the borehole further comprises:
    rigidly coupling the downhole seismic source to a wall or a casing of the borehole via clamps, cams, or wedges, or any combination thereof.

4. The method of claim 1, wherein the additional right weight further includes weight bars attached between the cable and the downhole seismic source.

5. The method of claim 1, comprising:
    drilling the borehole into the geological formation to beneath a weathering layer of the geological formation; and
    installing casing in the borehole;
    wherein coupling the downhole seismic source rigidly to the geological formation via the bottom of the borehole comprises further coupling the downhole seismic source to the casing of the borehole.

6. The method of claim 1, comprising detecting the controlled-frequency seismic signal using a seismic receiver located at a surface of the geological formation, beneath the surface in the same borehole, or beneath the surface in a different borehole.

7. A downhole seismic source comprising:
    a housing configured to couple to a geological formation via a bottom of a borehole in the geological formation; and
    an actuator attached to the housing, wherein the actuator is configured to generate a controlled-frequency seismic signal of less than 500 Hz to enable a seismic measurement of the geological formation,
    wherein the housing is configured to be coupled to a cable extending from the surface to convey the downhole seismic source in a borehole and to pipe extending along the cable that applies weight to the housing, thereby coupling the housing to the edge of the borehole, wherein the pipe extends from the housing of the geological formation to a surface of the geological formation.

8. The downhole seismic source of claim 7, wherein the housing is configured to rigidly couple to the geological formation via clamps, cams, wedges, weight, gravity, or any combination thereof.

9. The downhole seismic source of claim 7, wherein the actuator comprises a voice coil, a hydraulic actuator, a piezoelectric actuator, a magenetorestrictive actuator, or a pneumatic actuator, or any combination thereof.

10. The downhole seismic source of claim 7, comprising a position sensor configured to identify a position of the actuator, wherein the position sensor comprises a capacitive position sensor, an inductive position sensor, a magnetoresistive position sensor, an LVDT position sensor, an optical position sensor, or an electromagnetic reflectance position sensor, or any combination thereof.

11. The downhole seismic source of claim 7, comprising control circuitry configured control the actuator using a closed-loop control topology.

12. The downhole seismic source of claim 7, comprising control circuitry configured control the actuator using an open-loop control topology.

* * * * *